US006081941A

United States Patent [19]

Beck, Jr.

[11] Patent Number: 6,081,941

[45] Date of Patent: Jul. 4, 2000

[54] PORTABLE, SELF-CONTAINED TOILET SEAT

[76] Inventor: Henry N. Beck, Jr., 15526 Cloud Top, San Antonio, Tex. 78248

[21] Appl. No.: 09/172,840

[22] Filed: Oct. 15, 1998

Related U.S. Application Data

[60] Provisional application No. 60/062,179, Oct. 16, 1997.

[51] Int. Cl.[7] .......... A47K 11/02

[52] U.S. Cl. .......... 4/460; 4/449

[58] Field of Search .......... 4/458, 460, 483, 4/484, 449, 235, 237, 239

[56] References Cited

U.S. PATENT DOCUMENTS

| | | | |
|---|---|---|---|
| 82,636 | 9/1868 | Perkins . | |
| 2,228,927 | 1/1941 | Moore | 4/237 |
| 2,772,420 | 12/1956 | Carter | 4/458 |
| 3,865,431 | 2/1975 | Xakhi | 297/217 |
| 5,048,130 | 9/1991 | Brotman et al. | 4/483 |
| 5,267,355 | 12/1993 | Landman | 4/237 |
| 5,462,334 | 10/1995 | Sedorcek et al. | 297/252 |
| 5,852,832 | 12/1998 | Voigt et al. | 4/237 |

OTHER PUBLICATIONS

Bumper Dumper Web Site, Bumper Dumper, Jun. 8, 1999, 1–2; 1–4, Internet: www.bumperdumper.com;http://members.aol.com/bumperdmpr/bumper.htm.

Cabel's Fall Catalog, Bumper Buddy, Fall, 334–335, Cabels's Fall Catalog (1–800–237–4444).

Performance Products Catalog #2C, OSI Bike Rack; Ski Rack Adapter, Summer '97, 20–21, Performance Products Catalog 7658 Haskell Ave., Van Nuys, CA 91406–2005.

*Primary Examiner*—Charles E. Phillips
*Attorney, Agent, or Firm*—Cox & Smith Incorporated

[57] ABSTRACT

A portable toilet seat which may be removably mounted to a receiver mount towing hitch. The portable toilet seat includes two arcuate seat members each having a first end and a second end. The first end of each is affixed to the outside face of each of two rectangular shaft components which are attached to one another by means of a hinge. The hinge allows the arcuate seat members to fold such that the arcuate seat members rest side by side for easy storage and transport.

The present invention additionally provides a portable toilet seat which may be removably mounted to a receiver mount towing hitch, including two arcuate seat members and a shaft. The seat members each have a first end and a second end which are affixed to opposing sides of the rectangular shaft.

11 Claims, 2 Drawing Sheets

18 10 42 22 40 34 28 16 20 14 32 12 36 38

PORTABLE, SELF-CONTAINED TOILET SEAT

This is based on Provisional Application No. 60/062,179, filed Oct. 16, 1997, entitled PORTABLE, SELF-CONTAINED TOILET SEAT. Applicant claims the benefit under Title 35, United States Code, §199(e) of such Provisional Application.

BACKGROUND OF THE INVENTION

1. Field of the Invention

The present invention generally relates to portable toilet seats, more specifically to a portable toilet seat used in conjunction with a receiver mount towing hitch and which, for ease of storage and transport, can be folded and stored during non-use.

2. Background Information

Bathroom or toilet facilities are rarely available when participating in outdoor activities or sports such as hunting or fishing. These outdoor activities or sports typically take place in the woods, a field, or other site, all of which are often a significant distance from toilet facilities. Further, these outdoor sporting activities frequently take place over several days. In these situations, the absence of toilet facilities is both inconvenient and unsanitary. If appropriate toilet facilities were readily available, it is likely more people would participate in outdoor activities or sports. For those who currently participate in outdoor activities or sports, appropriate toilet facilities would not only be more convenient and sanitary, but more comfortable.

In an effort to address the need for sanitary toilet facilities, however, a number of portable toilet seats have been developed. The cumbersome size and labor intensive assembly associated with many of these portable seats, however, inhibits commercial success. Some of these devices have been designed for use with existing toilet facilities and primarily address avoiding contact with the existing toilet seat. Examples of such portable toilet seats are disclosed in U.S. Pat. Nos. 82,636 and 5,267,355. These designs, however, do not address the need experienced in situations where no toilet facilities are available.

U.S. Pat. No. 5,048,130 discloses a portable toilet involving a kit of items including a bottom box unit, a top toilet seat, a collapsible midunit, a collapsible insert unit, collection bags, and accessories which are used in conjunction with one another. A carrying case provides storage and transport, but the device is cumbersome and difficult to manage.

Pick-up trucks or other towing vehicles typically accompany those participating in outdoor sports or related activities. These types of vehicles are often considered a necessity and are usually equipped with a receiver mount towing hitch. Use of pick-up trucks and other similar vehicles during outdoor activities has led to the creation of bike racks and ski racks for use with a receiver mount towing hitch. While bike racks and ski racks used in conjunction with receiver mount towing hitches are known, portable toilet seats are not.

The portable toilet seat of the present invention has specific design features which distinguishes it from the prior art devices. These features allow for use of the toilet seat without the need for existing toilet facilities, assembly, carrying cases, separate toilet facility portions, or waste bags. Further, its use with already existing receiver mount towing hitches is convenient, simple, and inexpensive.

SUMMARY OF THE INVENTION

The present invention provides a portable toilet seat which may be removably mounted to a receiver mount towing hitch. The portable toilet seat includes two arcuate seat members and a shaft. The two arcuate seat members are affixed to the shaft which is suitable for inserting into a receiver mount towing hitch. The shaft further includes two rectangular shaft components which may, but do not have to be, hingedly attached. The rectangular shaft components each include an inside face and an outside face which are coplanar during non-use. During use, the inside faces of the rectangular shaft components oppose one another.

The present invention additionally provides a portable toilet seat removably mounted to a receiver mount towing hitch which includes two arcuate seat members affixed to opposing outside faces of a singular rectangular shaft. The singular rectangular shaft is again suitable for inserting into a receiver mount towing hitch.

It is an object of the present invention to provide a portable toilet seat which is easily stored and transported.

It is a further object of the present invention to provide a portable toilet seat which is used in conjunction with the standard receiver mount towing hitch.

It is a further object of the present invention to provide a self-contained portable toilet seat eliminating the need for waste bags, supporting box, carrying case, and assembly.

It is a further object of the present invention to provide a portable toilet seat which does not require use with existing toilet facilities.

It is a further object of the present invention to provide a portable toilet seat that allows for sanitary toilet facilities during outdoor activities and sports.

It is a further object of the present invention to provide a portable toilet seat which strength accommodates virtually all individuals.

The present invention is mobile and self-contained, requiring only a standard receiver mount towing hitch. The device is sanitary and is easily transported and stored.

DETAILED DESCRIPTION OF THE PREFERRED EMBODIMENT

The portable toilet seat of the present invention will now be described in detail by reference to specific figures; however, this detailed description should not be interpreted as limiting the principles of the invention.

Figure 1:
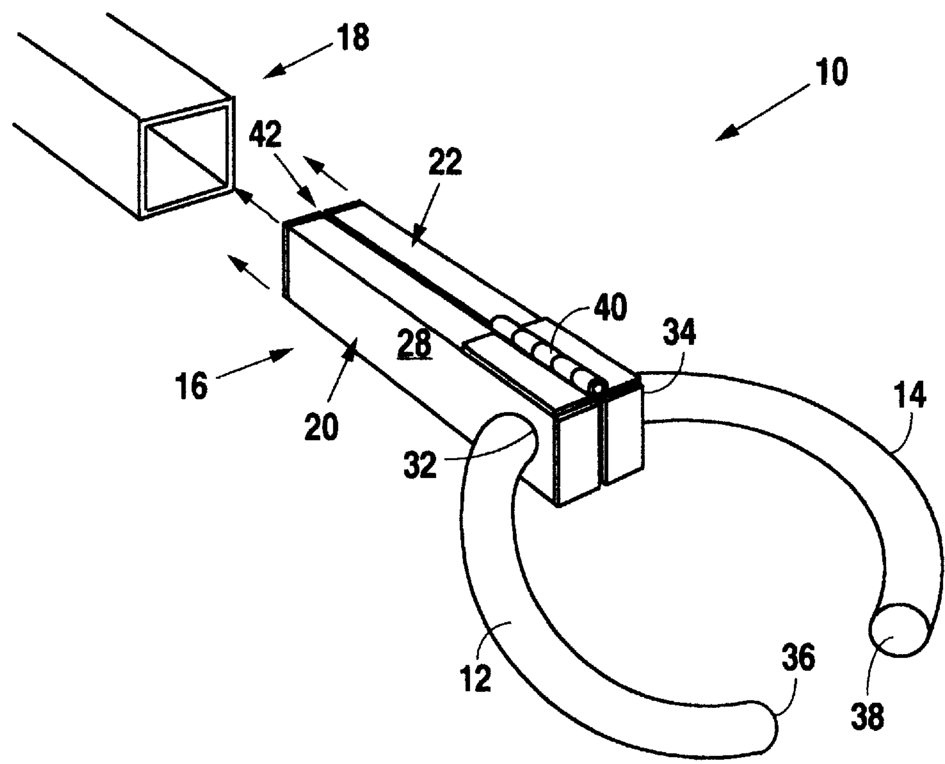
FIG. 1 is a perspective view of the preferred embodiment of the present invention in its folded, ready position.

FIG. 1 provides a perspective view of the present invention in its folded, ready position. The portable toilet seat (10) includes two seat members (12) and (14) and a shaft (16). The two seat members (12) and (14) are affixed to the shaft (16) which is suitable for inserting into a receiver mount towing hitch (18). The portable toilet seat (10) as shown in FIG. 1 further comprises two rectangular shaft components (20) and (22). In FIG. 1, the rectangular shaft components (20) and (22) are hingedly attached to form the shaft (16) when the toilet seat (10) is positioned for use. The rectangular shaft components (20) and (22), however, do not require an attachment means but may be inserted directly into the receiver mount towing hitch (18).

Referring again to FIG. 1, the rectangular shaft components (20,22) each have an inside face (24) (not visible in FIG. 1) and (26) (not visible in FIG. 1) and an outside face (28) and (30) (not visible in FIG. 1), respectively. The inside face (24) and (26) and the outside face (28) and (30) of each of the rectangular shaft components (20) and (22) are coplanar during non-use. (shown in FIG. 2) In contrast, the inside faces (24) and (26) of the rectangular shaft components (20) and (22) oppose one another during use of the portable toilet seat (10). (shown in FIG. 1)

Further, in Applicant's preferred embodiment, the seat members (12) and (14) are arcuate, each having a first end (32) and (34) and a second end (36) and (38). The first end (32) and (34) of each of the seat members (12) and (14) are affixed to the opposing outside faces (28) and (30) of the rectangular shaft components (20) and (22).

In Applicant's preferred embodiment, the rectangular shaft components (20) and (22) are connected by means of a hinge (40) facilitating the folding of the portable toilet seat (10) for convenient transport and storage. The hinge (40) is attached to the rectangular shaft components (20) and (22) such that the inside face (24) of rectangular shaft component (20) opposes the inside face (26)(not shown) of rectangular shaft (22) when the portable toilet seat (10) is in its folded, ready position.

When the portable toilet seat (10) is in its folded, ready position as shown in FIG. 1, the end (42) of the rectangular shaft (16) slides into a corresponding receiver mount towing hitch (18). The fit of the portable toilet seat (10) within the receiver mount towing hitch (18) secures the portable toilet seat (10) in its ready position.

Figure 2:
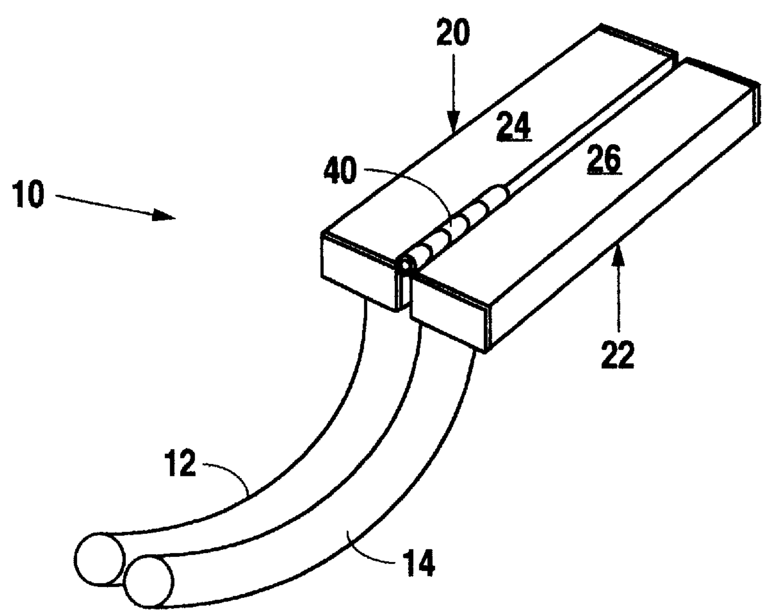
FIG. 2 is a perspective view of the preferred embodiment of the present invention in its unfolded position facilitating storage and transport.

FIG. 2 shows the portable toilet seat (10) in its unfolded position facilitating storage and transport. The arcuate seat members (12) and (14) rest side by side, while the rectangular shaft components (20) and (22) are coplanar. In its unfolded position, the inside faces (24) and (26) of the rectangular shaft components (20) and (22) are clearly visible and are coplanar. While the outside faces (28) (not visible in FIG. 2) and (30) (not visible in FIG. 2) of the rectangular shaft components (20) and (22) are not visible in FIG. 2, they are also coplanar. FIG. 2 also illustrates hinge (40) in its closed position facilitating convenient storage and transport.

Figure 3:
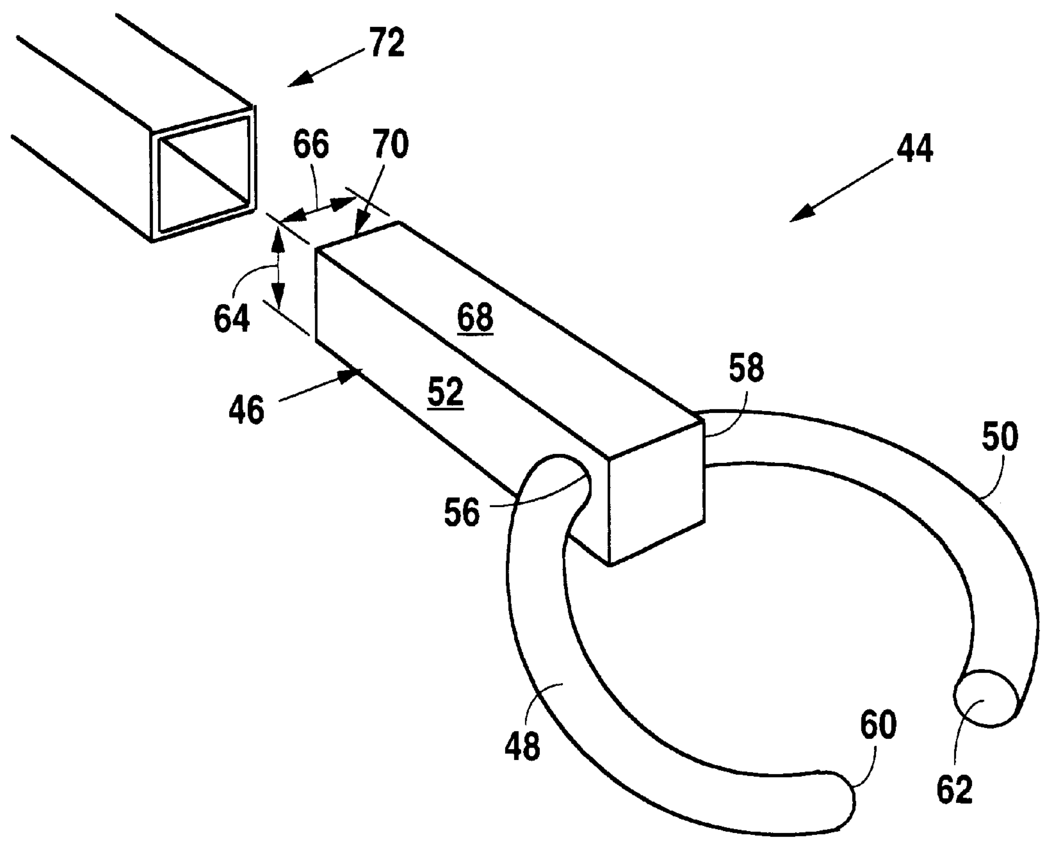
FIG. 3 is a perspective view of the present invention in its singular shaft embodiment.

FIG. 3 shows a perspective view of the portable toilet seat (44) in its singular shaft embodiment. The portable toilet seat (44) includes a shaft (46) and two seat members (48) and (50). The shaft (46) has two outside faces (52) and (54) (not visible in FIG. 3) which are parallel to one another. In Applicant's preferred embodiment, the seat members (48) and (50) are arcuate, each having a first end (56) and (58) and a second end (60) and (62). The first ends (56) and (58) of the seat members (48) and (50) are affixed to the opposite outside faces (52) and (54) of the shaft (46) such that the seat members (48) and (50) are affixed to opposite sides of the shaft (46).

In the preferred embodiment, dimension (64) of face (52) equals dimension (66) of face (68). The end (70) of singular shaft (46) slides into a corresponding receiver mount towing hitch (72) such that significant weight can be exerted on arcuate seat members (48) and (50).

Receiver mount towing hitches typically have a 2"×2" opening. Therefore, in Applicant's preferred embodiment, rectangular shafts (20) and (22), in combination, as well as singular rectangular shaft (46), are 2"×2". Rectangular shafts (20) and (22), as well as singular rectangular shaft (46), are not limited in size, however, but can be manufactured to accommodate a variety of receiver mount towing hitches.

Although Applicant has described his invention in detail with regard to the preferred embodiments, the disclosure is not intended to limit the invention, but rather, it is intended to cover such alternatives, modifications and equivalents that may be included in the spirit and scope of the invention as herein disclosed.

I claim:

1. A portable toilet seat for removably mounting to a receiver mount towing hitch, comprising:

two toilet seat members, said toilet seat members forming a U-shape and defining an open center, wherein said toilet seat members are arcuate and wherein said toilet seat members each have a first end and a second end; and a shaft, wherein said shaft includes two outside faces, said outside faces parallel and opposite to one another; and wherein said first end of each of said seat members is affixed to said opposing outside faces of said shaft; and wherein said toilet seat members are affixed to said shaft and said shaft is configured to insert into and securely engage a receiver mount towing hitch.

2. A portable toilet seat for removably mounting to a receiver mount towing hitch, comprising:

two toilet seat members, said toilet seat members forming a U-shape and defining an open center; and a shaft, wherein said shaft further comprises two longitudinally parallel rectangular shaft components, and wherein said toilet seat members are affixed to said shaft and shaft is configured to insert into and securely engage a receiver mount towing hitch.

3. A portable toilet seat for removably mounting to a receiver mount towing hitch, comprising:

two toilet seat members, said toilet seat members forming a U-shape and defining an open center; and a shaft, said shaft further comprising two longitudinally parallel rectangular shaft components, said longitudinally parallel rectangular shaft components hingedly attached to form said shaft when said toilet seat is positioned for use, and wherein said toilet seat members are affixed to said shaft and said shaft is configured to insert into and securely engage a receiver mount towing hitch.

4. The portable toilet seat of claim 3, wherein said rectangular shaft components each include an inside face and an outside face.

5. The portable toilet seat of claim 4, wherein said inside face and said outside face of each of said rectangular shaft components are coplanar during non-use.

6. The portable toilet seat of claim 5, wherein said inside face and said outside face of each of said rectangular shaft components oppose one another during use of said portable toilet seat.

7. The portable toilet seat of claim 6 wherein said seat members are arcuate.

8. The portable toilet seat of claim 7 wherein said seat members each include a first end and a second end.

9. The portable toilet seat of claim 8 wherein said first end of each of said seat members is affixed to said opposing outside faces of said rectangular shaft components.

10. A portable toilet seat for removably mounting to a receiver mount towing hitch, comprising:

a first arcuate seat member and a second arcuate seat member each having a first end and a second end; and a first rectangular shaft component and a second rectangular shaft component each having an inside face and an outside face, said inside face parallel to said outside face;

said first rectangular shaft component and said second rectangular shaft component hingedly attached; and said first end of said first arcuate seat member affixed to said outside face of said first rectangular shaft component and said first end of said second arcuate seat member affixed to said outside face of said second rectangular shaft component.

11. A portable toilet seat for removably mounting to a receiver mount towing hitch comprising:

a first arcuate seat member and a second arcuate seat member each having a first end and a second end; and a rectangular shaft having a first outside face and a second outside face, said first outside face and said second outside face parallel to and opposite one another;

said first end of said first arcuate seat member affixed to said first outside face of said rectangular shaft and said second arcuate seat member affixed to said second outside face of said rectangular shaft.

* * * * *